United States Patent [19]

Khasat et al.

[11] Patent Number: 4,835,230

[45] Date of Patent: May 30, 1989

[54] USE OF A CATIONIC POLYMERIZATION INITIATOR IN THE PREPARATION OF THERMOSET POLYMER

[75] Inventors: Nitya P. Khasat, Newark, Del.; Birendra K. Patnaik, Chester, Pa.

[73] Assignee: Hercules Incorporated, Wilmington, Del.

[21] Appl. No.: 258,365

[22] Filed: Oct. 17, 1988

[51] Int. Cl.$^4$ .................. C08F 36/20; C08F 4/22; C08F 2/02
[52] U.S. Cl. .................... 526/221; 526/137; 526/237; 526/281; 526/282; 526/283; 526/201; 522/186; 524/741; 524/788; 524/791; 264/328.2; 264/328.6
[58] Field of Search ............ 526/221, 237, 281, 282, 526/283, 137; 522/186; 264/328.2, 328.6

[56] References Cited

U.S. PATENT DOCUMENTS 3,247,172  4/1966  Faber ................................ 526/221
4,005,047  1/1977  Chauvin et al. ............... 526/190 X

FOREIGN PATENT DOCUMENTS 2438915  2/1975  Fed. Rep. of Germany ...... 526/283

OTHER PUBLICATIONS

Translation of Japanese Patent Laid-Open No. 53-24400, published 3/7/78.

Primary Examiner—Joseph L. Schofer
Assistant Examiner—F. M. Teskin
Attorney, Agent, or Firm—Joanne W. Patterson

[57] ABSTRACT

Disclosed is an improved method for making a thermoset polymer wherein a plurality of reactant streams, one of which contains the activator of a metathesis catalyst system combined with a moderator, and a second of which contains the catalyst of the metathesis catalyst system and at least one of which contains dicyclopentadiene are combined to form a reaction mixture, and the reaction mixture is then injected into a mold where polymerization occurs. The improvement comprises adding to the reaction mixture 1-25 mols of a cationic polymerization initiator per 1000 mols of dicyclopentadiene.

5 Claims, No Drawings

USE OF A CATIONIC POLYMERIZATION INITIATOR IN THE PREPARATION OF THERMOSET POLYMER

FIELD OF THE INVENTION

This inventioon relates to an improved metathesis catalyst system for the ring-opening polymerization of dicyclopentadiene and other strained ring polycyclic olefins. Specifically, it relates to the use of a cationic polymerization initiator in conjunction with a metathesis catalyst, to produce a cross-linked, thermoset dicyclopentadiene polymer having a high glass transition temperature ($T_g$) and a low residual monomer content.

BACKROUND OF THE INVENTION

It is known that a high modulus, high impact resistant thermoset polymer of dicyclopentadiene (DCPD) can be prepared by ring-opening polymerization of dicyclopentadiene in the presence of a metathesis catalyst. Such a process is described, for example, in U.S. Pat. No. 4,400,340 (Klosiewicz). The polymer has limited use in some applications, however, due to its relatively low glass transition temperature ($T_g$) of approximately 120° C. with correspondingly low heat deflection temperature (HDT) of approximately 80° C. (264 psi). Thus, the maximum use temperature of the polymer is limited to about 80° to 90° C., since the polymer begins to soften at temperatures above this range.

Various solutions have been proposed for overcoming this shortcoming, e.g., by copolymerizing dicyclopentadiene (DCPD) with other strained ring polycyclic cycloolefins such as, e.g., other cyclopentadiene oligomers. These processes and products are described, e.g., in U.S. Pat. No. 4,689,380 (Nahm) and 4,703,098 (Matlack).

The number_of applications for thermoset poly(DCPD) has also been somewhat limited because of the distinctive odor of the residual DCPD monomer that is sometimes present. One proposed solution to this problem is disclosed in U.S. Pat. No. 4,481,344 (Newburg). In this method a halogen-containing hydrocarbyl additive that contains at least one trihalogen-substituted carbon atom or at least one activated halogen atom is added to at least one of the reactant streams.

However, additional improvements in $T_g$ and HDT with simultaneous reduction in residual monomer contact would be desirable.

SUMMARY OF THE INVENTION

It has now been found that the inclusion of a cationic polymerization initiator in the reactant stream containing the catalyst, or as a separate reactant stream, can simultaneously increase the $T_g$ and HDT of thermoset dicyclopentadiene polymers and copolymers and reduce the residual monomer content of the polymer without reducing the impact strength.

The method of this invention is an improvement in the method for making thermoset DCPD homopolymers and copolymers wherein a plurality of reactant streams, one of which contains the activator of a metathesis catalyst system combined with a moderator, and a second of which contains the catalyst of said metathesis catalyst system and at least one of which contains dicyclopentadiene and/or other metathesis polymerizable strained ring polycyclic cycloolefins are combined to form a reaction mixture and the reaction mixture is then injected into a mold where polymerization occurs. The improvement to this process coprises adding from about 1 mol to about 25 mols of a cationic polymerization initiator per 1000 mols of dicyclopentadiene to the reaction mixture.

DETAILED DESCRIPTION OF THE INVENTION

The preferred monomer for preparing polymers according to the process of this invention is commercially available endo-dicyclopentadiene. The exo-isomer, while not commercially available, can also be used. The preferred commercially available monomer normally has a purity of at least 97% and preferably at least 99.7%.

The polymerization of the DCPD is catalyzed by a two part metathesis catalyst system. One part contains a metathesis catalyst, such as a tungsten or molybdenum halide or oxyhalide, preferably $WCl_6$ or $WOCl_4$. The other part contains an activator or cocatalyst, typically an alkylaluminum compound. The alkylaluminum compound can be an alkylaluminum dihalide or dialkylaluminum halide, where the alkyl group contains one to ten carbon atoms. The preferred activator is a mixture of dioctylaluminum iodide and trioctylaluminum.

One part of the catalyst system comprises the metathesis catalyst, as described above, typically a tungsten compound, in solution with DCPD monomer. The tungsten compound can be solubilized in DCPD by the addition of a small amount of an alcoholic or a phenolic compound. Phenolic compounds are preferred. Suitable phenolic compounds include phenol, ortho-, meta- or para-alkyl phenols, and halogenated phenols, with tert-butylphenol, tert-octylphenol and nonylphenol being most preferred. The preferred molar ratio of tungsten compound/phenolic compound is from about 1:1 to about 1:3. The tungsten compound/phenolic compound solution can be made by adding the phenolic compound to a tungsten compound/organic solvent slurry, stirring the solution and then blowing a stream of a dry inert gas through the solution to remove the hydrogen chloride that is formed. Alternatively, a phenolic salt, such as a lithium or sodium phenoxide, can be added to a tungsten compound/organic solvent slurry, the mixture stirred until essentially all of the tungsten compound is dissolved, and the precipitated inorganic salt removed by filtration or centrifugation. All of these steps should be carried out in the absence of moisture and air to prevent deactivation of the catalyst.

To prevent premature polymerization of the tungsten compound/monomer solution, which would occur within a matter of hours, from about 1 to about 5 moles of a Lewis base or a chelating agent can be added per mole of tungsten compound. Preferred chelants include acetylacetones and alkyl acetoacetates, where the alkyl group contains from one to ten carbon atoms. Preferred Lewis bases are nitriles and ethers such as benzonitrile and tetrahydrofuran. The improvement in the stability and shelf life of the tungsten compound/monomer solution is obtained whether the complexing agent is added before or after the phenolic compound. When DCPD is added to this catalyst solution it forms a solution that is stable and has a shelf life of several months. Additional descriptions of catalyst preparation can be found in, e.g., Klosiewicz, U.S. Pat. No. 4,568,660.

The other part of the metathesis catalyst system comprises the activator, as described above, preferably in solution with DCPD monomer. This mixture is storage stable and therefore, unlike the tungsten compound/monomer solution, needs no additives to prolong its shelf life. If, however, an unmodified activator/monomer solution is mixed with the catalyst/monomer solution, the polymerization would initiate instantaneously and the polymer could set up in the mixing head. The onset of polymerization can be delayed by adding a reaction rate moderator to the activator/monomer solution. Ethers, esters, ketones and nitriles can act as moderators for the alkylaluminum compounds. Ethyl benzoate and butyl ether are preferred. Particularly preferred is the dimethyl ether of diethylene glycol (diglyme). If longer delay or slower initiation of reaction is desirable, a sterically unhindered or partially unhindered nucleophilic Lewis base such as pyridine, quinoline or quinoxaline can be used as the moderator. The preferred ratio of the alkylaluminum compound to moderator is from about 1:1.5 to about 1:5 on a molar basis.

In a preferred synthesis, the poly(DCPD) is made and molded with the reaction injection molding (RIM) process. The two parts of the metathesis catalyst system are each mixed with DCPD to form solutions that are placed in separate vessels. These containers provide the source for separate streams. The two streams are combined in the RIM machine's mixing head and then injected into a warm mold where they quickly polymerize into a solid, infusible mass. The invention is not intended to be limited to systems employing two streams each containing monomer. In fact, in practicing the instant invention there are good reasons to add the cationic initiator as a third reactant stream.

In accordance with this invention, a cationic polymerization initiator is added to the reaction mixture prior to injection thereof into the mold. A cationic polymerization initiator is defined as a catalyst or compound which, either alone or in conjunction with a cocatalyst, leads to the generation of carbocations that are capable of cationically polymerizing suitable monomers. Suitable initiators include protonic acids, Lewis acids and other cation generators such as alkyl perchlorates and ionizing radiation. Lewis acids are preferred. Suitable Lewis acids include, but are not limited to, halides of boron, aluminum, titanium, antimony, bismuth, zirconium and tin. $SnCl_4$ is preferred.

The cationic polymerization initiator is added in an amount of 1 mol to about 25 mols initiator per 1000 mols of DCPD. From 1 mol to about 10 mols is preferred. From 1 mol to about 5 mols is most preferred. The initiator can be added as such or can be formed in situ, for example, by adding the initiator in the form of a complex that will subsequently decompose. The cationic polymerization initiator can be added to the DCPD/catalyst solution, but in this circumstance the mixture should be used within 24 hours of preparation. As mentioned previously, from about 1 to about 5 moles of a Lewis base or a chelating agent are added to the DCPD/catalyst solution per mole of tungsten compound to prevent premature polymerization. The amount of Lewis base or chelating agent present is not sufficient, however, to prevent polymerization of the DCPD in the presence of the cationic polymerization initiator if they are left in contact for more than 24 hours. The initiator is preferably added to the mixing head as a separate stream to avoid premature polymerization. The cationic polymerization initiator is preferably dissolved in DCPD monomer for addition to the reaction mixture.

The process of the invention can be used to polymerize DCPD monomer alone or in combination with one or more other norbornene-type comonomers such as norbornene, methylnorbornene, vinylnorbornene, ethylidenenorbornene, tetracyclododecene(1,4,5,8-dimethano-1,2,4a,5,8,8a-octahydronaphthalene), methyltetracyclododecene, tetracyclododecadiene, and cyclopentadiene oligomers such as cyclopentadiene trimer (CPT) and higher oligomers. Any of the norbornene monomers can also be polymerized alone.

Various additives can be included to modify the properties of poly(DCPD). Possible additives include fillers, pigments, antioxidants, light stabilizers and polymeric modifiers. Because of the rapid polymerization time, the additives are incorporated before the DCPD is charged to the mold. It is often desirable that the additives be combined with one or both of the catalyst system's streams before being injected into the mold. Fillers can also be charged to the mold cavity, prior to charging the reaction streams, if the fillers are such that the reaction stream can readily flow around them to fill the remaining void space in the mold. It is essential that the additives not affect catalytic activity.

One class of possible additives is reinforcing agents or fillers that can increase the polymer's flexural modulus with only a small sacrifice in impact resistance. Possible fillers include glass, wollastonite, mica, carbon black, talc, and calcium carbonate. It is surprising that in spite of the highly polar nature of their surfaces, these fillers can be added without appreciably affecting the polymerization rate. From about 5% to 75% by weight may be incorporated, based on the weight of the final product. The addition of fillers that have modified surface properties is particularly advantageous. The exact amount is easily determinable by one skilled in the art and depends on the preferences of the practitioner. The addition of fillers also serves to decrease the mold shrinkage of the product.

Since poly(DCPD) contains some unsaturation it may be subject to oxidation. The product can be protected from oxidation by the incorporation of as much as about 2.0 wt% of a phenolic or amine antioxidant. Preferred antioxidants include 2,6-tert-butyl-p-cresol, N,N'-diphenyl-p-phenylenediamine and tetrakis[methylene(3,5-di-t-butyl-4-hydroxycinnamate)]-methane. While the antioxidant can be added to either or both streams, incorporation into the activator/monomer stream is preferred.

The addition of an elastomer can increase the impact strength of the polymer with only a slight decrease in flexural modulus. The elastomer can be dissolved in one or both of the dicyclopentadiene streams. The amount of elastomer used is determined by its molecular weight and by the initial viscosity of the streams to which it is added. Amounts within the range of 1 to 10% by weight and preferably 5 to 10% by weight of the total stream can be used without causing an excessive increase in solution viscosity. An example of preferred elastomer is styrene-butadiene rubber made by solution polymerization. The streams cannot be so viscous that adequate mixing of the streams is not possible, but increasing the viscosity to between 300 cps and 1,000 cps improves the mold filling characteristics of the combined streams. The elastomer is preferably added to both dicyclopentadiene streams so that the viscosities of the two streams are similar. When the two streams have similar viscosities, more uniform mixing is obtained when the streams are combined. An increase in viscosity also reduces leakage from the mold and simplifies the use of fillers by decreasing the settling rate of solid filler materials. Useful elastomers can be unsaturated hydrocarbon elastomers such as, e.g., styrenebutadiene rubber, polyisoprene, polybutadiene, natural rubber, styrene-isoprene-styrene triblock rubber, styrene-butadiene-styrene triblock rubber, and ethylene-propylene-diene terpolymers, or saturated elastomers such as polyisobutylene and ethylene-propylene copolymers.

EXAMPLE 1

Preparation of Catalyst Components

An activator concentrate is prepared by slowly adding 75.0 g of diglyme (dimethyl ether of diethylene glycol), via syringe, to a mixture of 174.0 g of tri-n-octylaluminum and 35 g of dioctylaluminum iodide in a pop bottle under nitrogen.

A 0.5 molar catalyst solution is prepared by weighing 14.85 g (37.5 m mole) of $WCl_6$ into a 200 ml pop bottle containing a stirring bar. The tungsten is then slurried in 32.5 g dry toluene. Tert-butanol (0.67 g, 9.1 m mole) dissolved in 0.37 g toluene is added and the mixture stirred for one hour while sparging with nitrogen. Nonylphenol (9.9 g, 0.45 m mole) dissolved in 6.6 g (7.6 ml) toluene is added and the mixture stirred for one hour while sparging with nitrogen. Acetyl acetone (7.5 g, 75 m mole) is then added by syringe and the mixture is stirred overnight while continuing the sparging with nitrogen. Toluene is then added until the original volume is restored, resulting in a 0.5 molar solution.

The tin tetrachloride polymerization initiator solution is prepared by adding toluene to neat $SnCl_4$ to make a 1 molar solution.

EXAMPLES 2-6

Polymerization

Polymerization of dicyclopentadiene (DCPD), or a mixture of DCPD and cyclopentadiene trimer (CPT), is carried out by one of the following procedures. Dicyclopentadiene monomer or the mixture with CPT is injected into a 1" diameter serum capped test tube that has previously been sparged with nitrogen for 10 minutes. In procedure "A", the activator, prepared as described in Example 1, is added. After mixing, the tungsten catalyst and tin catalyst solutions, prepared as described in Example 1, are injected by a syringe and the contents of the test tube are shaken a few times. In procedure "B," the tungsten and tin catalyst solutions are injected and the test tube's contents are shaken several times. After ten minutes, the activator is introduced and the mixture is shaken. The alternate procedures are used to determine whether the order of addition of the components will affect the results. In each case. the test tube is kept at room temperature until an exotherm occurs. After completion of the exotherm, the test tube is cooled and a polymer plug is recovered by breaking the test tube. Test specimens ($2\frac{1}{2}"\times\frac{1}{2}"\times\frac{1}{8}"$) are machine cut and evaluated for glass transition temperature by dynamic mechanical analysis using a Rheometrics dynamic spectrometer. The amount of residual monomer is determined using gas chromatography. The sample is extracted overnight in a solution of toluene containing n-dodecane internal standard. An aliquot of the extract is chromatographed on a 10% Carbowax 20M/Supelcoport column using a flame ionization detector. The results are given in Table 1. All ratios in the table are by weight (W/W).

TABLE 1[1]

| Example | Procedure | DCPD/CPT (W/W) | DCPD/$SnCl_4$[2] (moles) | Al/W/Sn (moles) | $T_g$, °C.[3] | Residual Monomer (wt. %) | HDT, °C. 264 psi |
|---|---|---|---|---|---|---|---|
| 2 (Control) | A | 100/0 | 1000/0 | 3/1/0 | 128 | 2.47 | 101 |
| 3 | A | 100/0 | 1000/1 | 3/1/1 | 140 | 1.37 | 120 |
| 4 | A | 100/0 | 1000/5 | 3/1/5 | 150 | 0.52 | — |
| 5 | B | 100/0 | 1000/1 | 3/1/1 | 139 | 1.12 | — |
| 6 | A | 90/10 | 1000/1 | 3/1/1 | 153 | 0.28 | — |

[1]Polymerization recipe: DCPD = 20 ml; Al activator = 0.24 m mole (0.24 ml); Tungsten = 0.08 m mole (0.16 ml)
[2]$SnCl_4$ = 0.08 and 0.40 m mole, representing 1000/1 and 1000/5 DCPD/$SnCl_4$ mole ratios, respectively.
[3]Tan δ peak by dynamic mechanical analysis.

EXAMPLES 7 TO 10

Polymerization Via Reaction Injection Molding

The following examples describe the method for making the thermoset polymer according to this invention by reaction injection molding (RIM). Samples are made using a standard RIM machine supplied by The Accuratio Company, Jeffersonville, Ind. The procedure for molding samples is as follows: First, two monomer storage tanks, A & B, are sparged with nitrogen. A mixture of dicyclopentadiene, cyclopentadiene trimer (CPT) and EPDM rubber is charged into each tank at the ratio indicated in Table 2. Alkylaluminum activator concentrate, prepared as described in Example 1, is then added to tank "A" so that the resulting concentration of the activator is 1.678 moles/1000 moles DCPD. Next, tungsten catalyst solution, prepared as described in Example 1, is added to tank "B" in such a manner that the resultant concentration of the tungsten catalyst is 0.562 moles/1000 moles DCPD. The desired amount of a solution of stannic chloride in dicyclopentadiene is then added to tank "B" in such a manner that the desired tin catalyst concentration is attained. All transfers of chemical reagents and catalysts are carried out in a manner that prevents contamination by oxygen or moisture.

The mixing of the streams from tanks "A" and "B" is accomplished using a standard impingement type RIM mixing head by passing both streams through orifices 0.032 inches in diameter at a flow rate of approximately 80 ml/second at a pumping pressure of approximately 1000 psi. The ratio of activator/comonomer solution mixed with the catalyst/comonomer solution is 1:1 and the concentration of the tin catalyst, when used, is 1 mole/1000 mole dicyclopentadiene in the mixed stream. The resulting mixture of streams from tanks "A" and "B" flows directly into a mold heated to 50°-60° C. The polymerization is complete approximately 10–30 seconds after the mold is filled. The mold is then opened and a plaque sample ($10"\times10"\times\frac{1}{8}"$) is removed for evaluation of $T_g$, heat deflection temperature (HDT) according to ASTM D-648, % residual monomer and notched Izod impact resistance (ASTM D-256). The test results are given in Table 2. All ratios in the table are by weight (W/W).

TABLE 2

| Example | Monomer Composition DCPD/CPT/EPDM (W/W) | DCPD/SNCl₄ (moles) | Tg, °C.[1] | HDT, °C., 264 psi | Residual Monomer (wt. %) | Notched Izod (ft lb/in notch) |
| --- | --- | --- | --- | --- | --- | --- |
| 7 (Control) | 97/3/4.5 | 1000/0 | 132 | 89 | 2.63 | 9.9 |
| 8 | 97/3/4.5 | 1000/1 | 142 | 101 | 1.00 | 10.3 |
| 9 (Control) | 89/11/4.5 | 1000/0 | 154 | 100 | 1.7 | 6.1 |
| 10 | 89/11/4.5 | 1000/1 | 166 | 109 | 1.7 | 6.2 |

[1]Tan δ peak by dynamic mechanical analysis.

What we claim and desire to protect by Letters Patent is:

1. In a method for making a thermoset polymer wherein a plurality of reactant streams, one of which contains the activator of a metathesis catalyst system combined with a moderator, and a second of which contains the catalyst of said metathesis catalyst system and at least one of which contains dicyclopentadiene, are combined to form a reaction mixture, and the reaction mixture is then injected into a mold where polymerization occurs, the improvement which comprises adding to the reaction mixture about 1 mol to about 25 mols of a cationic polymerization initiator per 1000 mols of dicyclopentadiene.

2. The method of claim 1 wherein the initiator is tin tetrachloride.

3. The method of claim 2 wherein the amount of initiator added is from 1 to about 5 mols per 1000 mols of dicyclopentadiene.

4. The method of claim 1 wherein the cationic polymerization initiator is added as part of the catalyst stream.

5. The method of claim 1 wherein the cationic polymerization initiator is added as a separate stream.

* * * * *

UNITED STATES PATENT AND TRADEMARK OFFICE
CERTIFICATE OF CORRECTION

PATENT NO. : 4,835,230
DATED : May 30, 1989
INVENTOR(S) : Khasat & Patnaik

It is certified that error appears in the above-identified patent and that said Letters Patent is hereby corrected as shown below:

Column 1, line 48 " contact "

should read -- content --

Column 6, line 65 "(10" X 10" X 1/8 |) "

should read --(10" X 10" X 1/8") --

Signed and Sealed this

Thirteenth Day of February, 1990

Attest:

JEFFREY M. SAMUELS

Attesting Officer     Acting Commissioner of Patents and Trademarks